United States Patent [19]

Whitmore, Jr. et al.

[11] Patent Number: 4,766,574
[45] Date of Patent: Aug. 23, 1988

[54] METHOD FOR DEPTH IMAGING MULTICOMPONENT SEISMIC DATA

[75] Inventors: Norman D. Whitmore, Jr., Broken Arrow; Kurt J. Marfurt, Tulsa, both of Okla.

[73] Assignee: Amoco Corporation, Chicago, Ill.

[21] Appl. No.: 32,907

[22] Filed: Mar. 31, 1987

[51] Int. Cl.$^4$ ............................................. G01V 1/28
[52] U.S. Cl. ..................................... 367/50; 367/41; 367/75; 364/421
[58] Field of Search .................... 364/421; 367/40, 41, 367/50, 53, 54, 59, 75

[56] References Cited

U.S. PATENT DOCUMENTS 4,110,729  8/1978  Vreugde ............................... 367/63
4,611,312  9/1986  Ikeda ..................................... 367/50
4,628,492 12/1986  Winney ................................. 367/43

OTHER PUBLICATIONS

"Elastic Wave Equation Migration-Inversion," Marfurt, K. J., Columbia Univ., Ph.D. Thesis, 1978 (abstract only).
C. H. Chapman, "Generalized Radon Transforms and Slant Stacks," Geophys. J. R. astr. Soc., 1981, 66.
K. Aki et al., "Quantitative Seismology Theory and Methods," vol. 1, Freeman & Co., 1980.
Whitmore, N. D., "Iterative Depth Migration by Backward Time Propagation," 1983 Annual Meetings Abstract, SEG Geophysics, vol. 49, #5.
Marfurt, K. J., "Elastic Wave Equation Migration-Inversion," PHD Thesis, Columbia University 1978.

Primary Examiner—Thomas H. Tarcza
Assistant Examiner—Ian J. Lobo
Attorney, Agent, or Firm—Timothy D. Stanley

[57] ABSTRACT

The present invention relates generally to a method of geophysical exploration and more particularly to a novel method for imaging multicomponent seismic data to obtain better depth images of the earth's subsurface geological structure as well as better estimates of compressional and shear wave interval velocities. In particular, measures are obtained of imparted seismic wavefields incident on reflecting interfaces in the earth's subsurface and of resulting seismic wavefields scattered therefrom. The incident and scattered seismic wavefields are employed to produce time-dependent reflectivity functions representative of the reflecting interfaces. By migrating the time-dependent reflectivity functions, better depth images of the reflecting interfaces can be obtained. For a dyadic set of multicomponent seismic data, the dyadic set of multicomponent seismic data are partitioned so as to separate the variously coupled incident and reflected wavefields in the recorded multicomponent seismic data. The incident and reflected wavefields are cross-correlated to form time-dependent reflectivity functions. The time-dependent reflectivity functions are then iteratively migrated according to a model of wavefield velocities of propagation to obtain better estimates of the compressional and shear wave interval velocity. The migrated reflectivity functions can then be stacked to produce better depth images of the earth's subsurface geological structures.

31 Claims, 16 Drawing Sheets

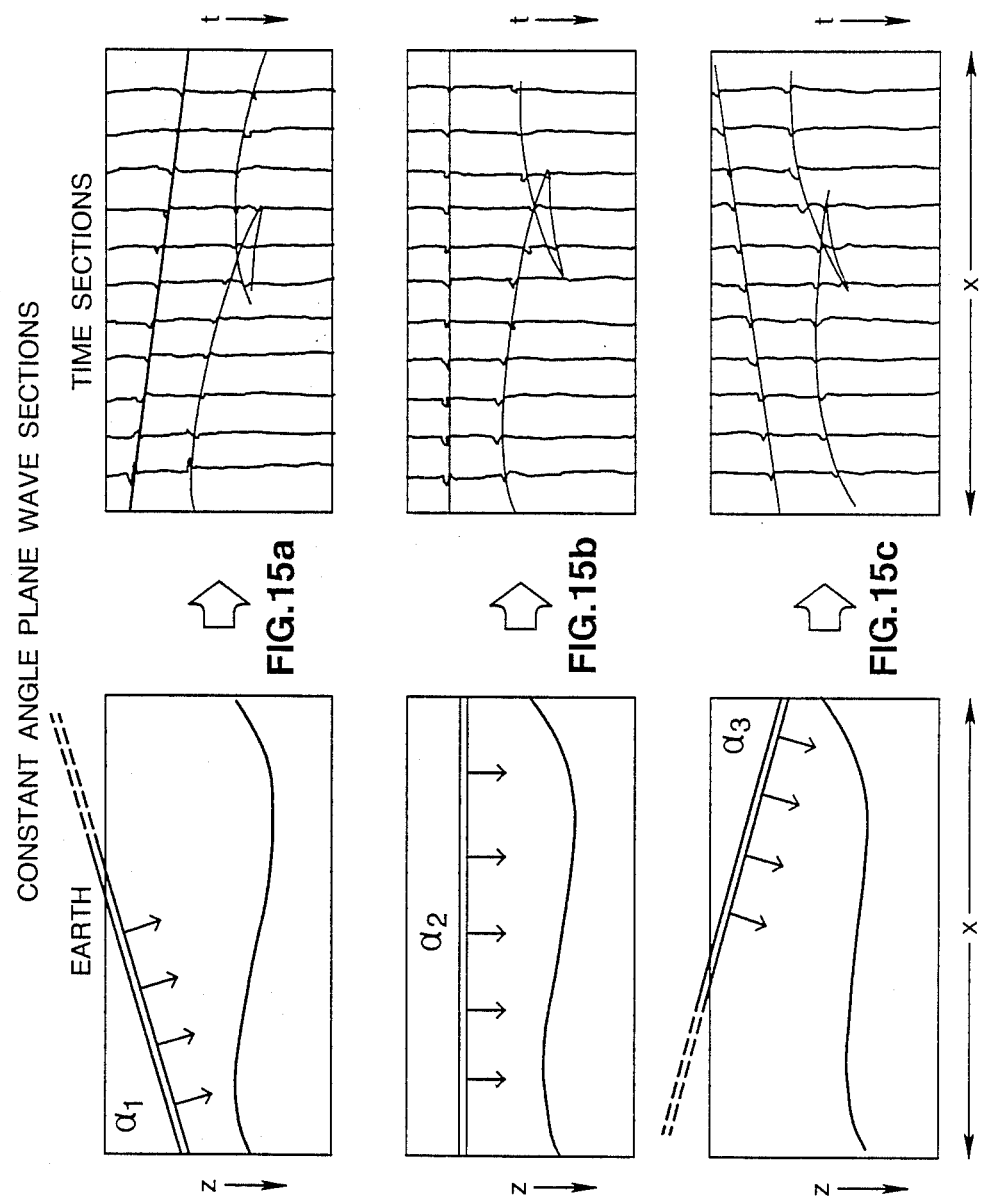

METHOD FOR DEPTH IMAGING MULTICOMPONENT SEISMIC DATA

BACKGROUND OF THE INVENTION

The present invention relates generally to processing seismic data and more particularly to a method for imaging multicomponent seismic data to obtain better depth images of the earth's subsurface geological structure as well as better estimates of compressional and shear wave interval velocities.

Seismic exploration in its simplest form comprises imparting seismic energy into the earth with a seismic source (e.g., dynamite, vibrator, airgun, etc.) and recording the earth's response thereto with receivers (e.g., geophones, transducers, hydrophones, etc.). The seismic data recorded by such receivers are commonly referred to as seismic signals or seismic-trace signals. A plurality of such seismic signals obtained from a selected region of interest can be used to form seismograms or seismic sections to aid the geophysicist in interpreting the earth's subsurface geological structure. More recently, multicomponent seismic data acquisition techniques have been developed for recording sets of multicomponent seismic signals.

Generally, multicomponent seismic data acquisition techniques comprise imparting seismic energy into the earth with seismic sources having one or more linearly independent lines of action (i.e., known vector displacement or traction) and recording the earth's response with sets of receivers having at least two linearly independent lines of action. In practice, multicomponent seismic data can be acquired using seismic sources having horizontal transverse, horizontal radial and vertical lines of action and recording the earth's response to the imparted seismic energy with receivers having horizontal transverse, horizontal radial and vertical lines of action. Unfortunately, by common practice such sources and receivers are referred to as horizontal shear (SH), vertical shear (SV), and compressional (P) sources and receivers, respectively. This terminology is both inexact and misleading since sources and receivers do not directly impart or record such wavefields (i.e., horizontal shear, vertical shear or compressional) but rather impart and record known vector displacements from which it is possible, by partitioning, to separate the various wavefields.

Seismic data is usually processed in the common midpoint (CMP) format. Typically, part of the processing of the seismic data can include the step of migrating stacked CMP gathers of seismic signals. Migration is the process of placing reflection events recorded in the seismic data at their proper spatial location. Migration is especially important for correctly plotting dipping bed reflections in their true spatial position rather than midway between the activated source and the recording receiver. When the migration process is applied to CMP stacked seismic data, serious errors can result when the subsurface geological structures are complex (i.e., not simply a series of parallel, horizontal bedding planes). The errors introduced are the result of CMP processing of seismic data from complex subsurface geological structures because the reflection points are no longer common nor midway between the seismic source and receiver. Among the more significant limitations of such processing schemes are the inability to determine interval velocities in complex structures and the consequent inability to produce optimum depth migrated seismograms. Additionally, such processing is inadequate to separate and process coupled compressional and shear wave reflections in the recorded seismic data. Moreover, when mode converted wavefields are recorded, CMP stacking is extremely noise sensitive. Exemplary of such migration technique when applied to CMP formatted seismic data is shown by Vreugde in U.S. Pat. No. 4,110,729. The method of depth imaging multicomponent seismic data of the present invention is adapted to overcome these limitations.

SUMMARY OF THE INVENTION

The present invention relates generally to a method of geophysical exploration and more particularly to a novel method for imaging multicomponent seismic data to obtain better depth images of the earth's subsurface geological structure as well as better estimates of compressional and shear wave interval velocities. In particular, measures are obtained of imparted seismic wavefields incident on reflecting interfaces in the earth's subsurface and of resulting seismic wavefields scattered therefrom. The incident and scattered seismic wavefields are employed to produce time-dependent reflectivity functions representative of the reflecting interfaces. By migrating the time-dependent reflectivity functions, better depth images of the reflecting interfaces can be obtained. For a dyadic set of multicomponent seismic data, the dyadic set of multicomponent seismic data are partitioned so as to separate the variously coupled incident and reflected wavefields in the recorded multicomponent seismic data. The incident and reflected wavefields are cross-correlated to form time-dependent reflectivity functions. The time-dependent reflectivity functions are then iteratively migrated according to a model of wavefield velocities of propagation to obtain better estimates of the compressional and shear wave interval velocity. The migrated reflectivity functions can then be stacked to produce better depth images of the earth's subsurface gelogical structures.

BRIEF DESCRIPTION OF THE DRAWINGS

FIGS. 15a, b, c represent three different beam formed plane wave illuminations of a subsurface model;

DESCRIPTION OF THE PREFERRED EMBODIMENT

To aid in understanding the present invention, the following discussion is provided. The seismic exploration technique most fundamentally comprises imparting seismic energy into the earth and recording the earth's response thereto as seismic signals. Multicomponent seismic data acquisition comprises imparting seismic energy into the earth with a seismic source or sources having one or more linearly independent lines of action $\tau_i$ (i.e., a known vector displacement or traction where the subscript i represents a particular line of action) and recording the earth's response thereto with sets of receivers having two or more linearly independent lines of action as seismic signals $U_{ij}$ (where the subscript i represents the line of action of the source and j represents the line of action of the geophone recording the signal). Thus, the seismic signals $U_{ij}$ can represent the tensor displacement response of the earth to seismic energy imparted by a seismic source having a line of action i and recorded by a receiver having a line of action j.

Figure 1:
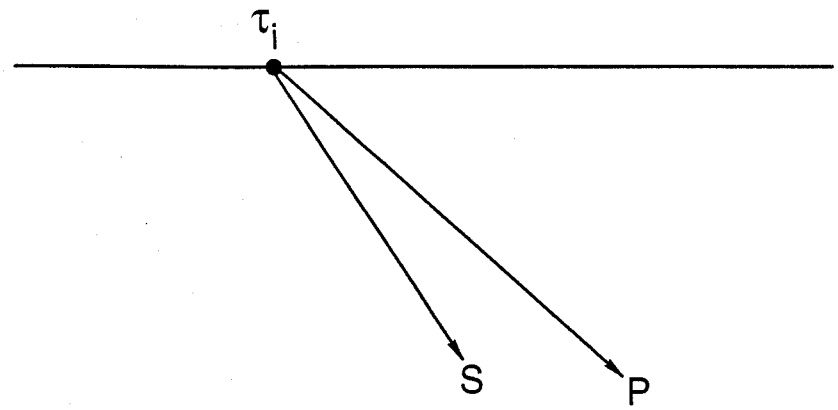
FIG. 1 is a representation of the compressional (P) and shear (S) wavefields developed by a seismic source having traction $\tau_i$.
Figure 2:
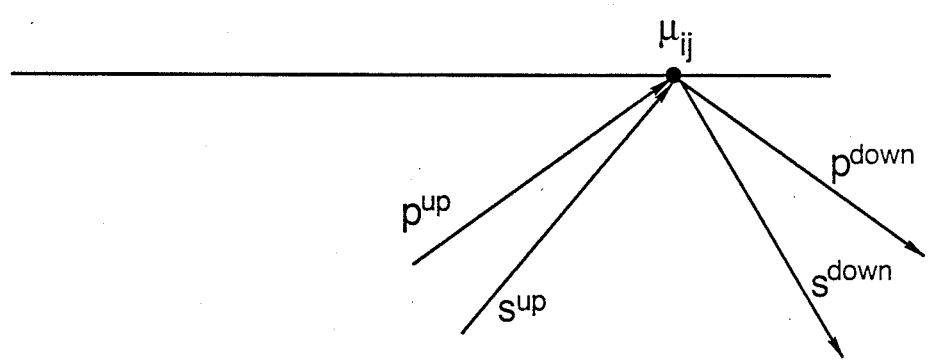
FIG. 2 is a representation of the reflected compressional (p) and shear (s) wavefields recorded in the seismic data $U_{ij}$.

Typically, seismic sources generate horizontal transverse, horizontal radial and vertical displacements or tractions $\tau_i$ (with respect to a line of survey) and such sources are commonly referred to as horizontal shear wave (SH), vertical shear wave (SV) and compressional wave (P) sources, respectively. Such nomenclature describes the general nature of the wavefield developed by such sources vertically below the source. Although incorrect and misleading in conventional multi-offset records of seismic data, this nomenclature is well entrenched terminology. As depicted in FIG. 1, a seismic source having a traction $\tau_i$ can be seen to develop both compressional (P) and shear (S) wavefields. Similarly, receivers typically measure horizontal transverse, horizontal radial and vertical displacements of the earth with respect to the line of survey. As depicted in FIG. 2, receivers record sesimic data $U_{ij}$ in response to scattered upgoing and downgoing shear wavefields ($s^{up}$, $s^{down}$) and compressional wavefields potentials ($p^{up}$, $p^{down}$). Nevertheless, such receivers are commonly referred to as horizontal shear (SH), vertical shear (SV) and compressional (P) receivers, respectively. The importance of the distinction between measured tensor displacements and wavefields will be discussed further.

Figure 3:
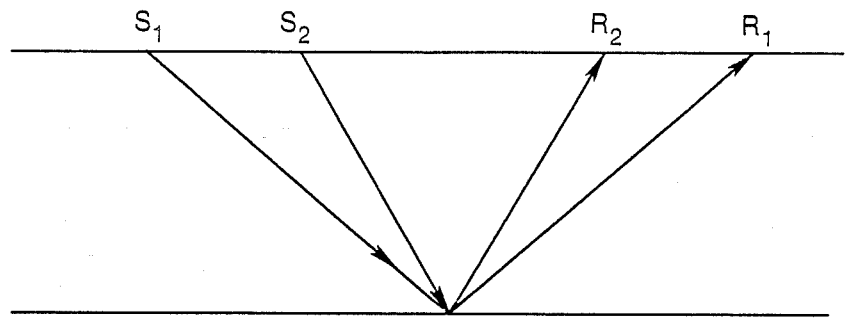
FIG. 3 depicts common midpoint (CMP) gather of seismic data.
Figure 4:
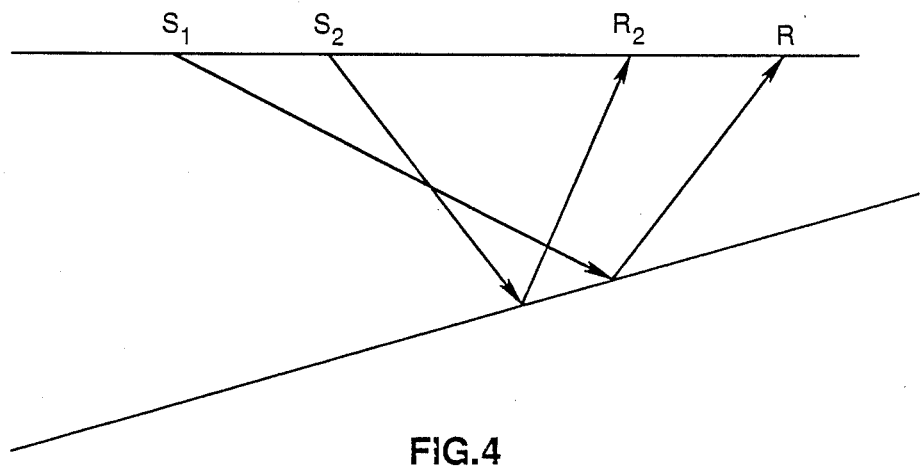
FIG. 4 depicts a CMP gather of seismic data for dipping beds.
Figure 5:
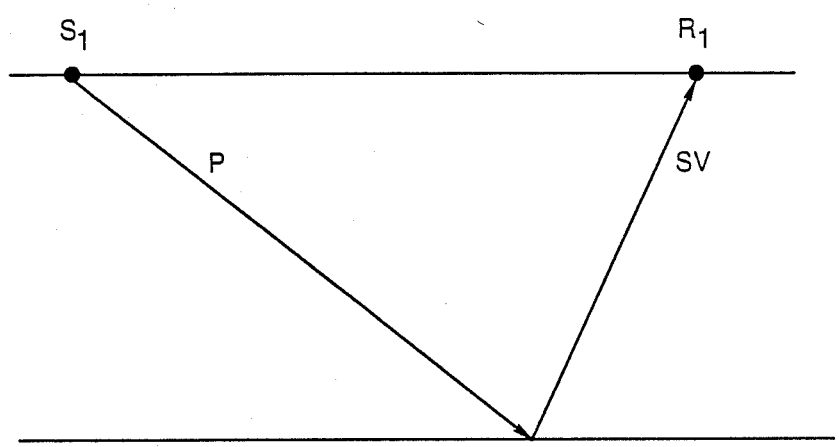
FIG. 5 is a representation of an imparted compressional (P) wave which is mode converted to a shear (SV) wave upon scattering from a reflecting interface.

Most commonly, seismic data, including multicomponent seismic data, are processed in common midpoint (CMP) format. That is, the seismic data are sorted into CMP gathers, as shown in FIG. 3 for a plurality of sources $S_l$ and receivers $R_m$, and normal moveout corrected. Such processing scheme assumes that the spatial location of a reflection point is midway between the activated seismic source and the recording receiver. As a consequence, stacking of CMP gathers of seismic signals recorded for dipping beds, as shown in FIG. 4 for a pair of sources $S_l$ and receivers $R_m$, can produce serious errors. For horizontal bedding planes, no error results. However, for dipping bedding planes, the reflection points are neither common nor midway between the activated seismic source and the recording receiver. For CMP gathers of mode converted, wavefields (for example, incident P-reflected SV, as shown in FIG. 5), the common midpoint rule fails even for horizontal bedding planes.

Figure 6:
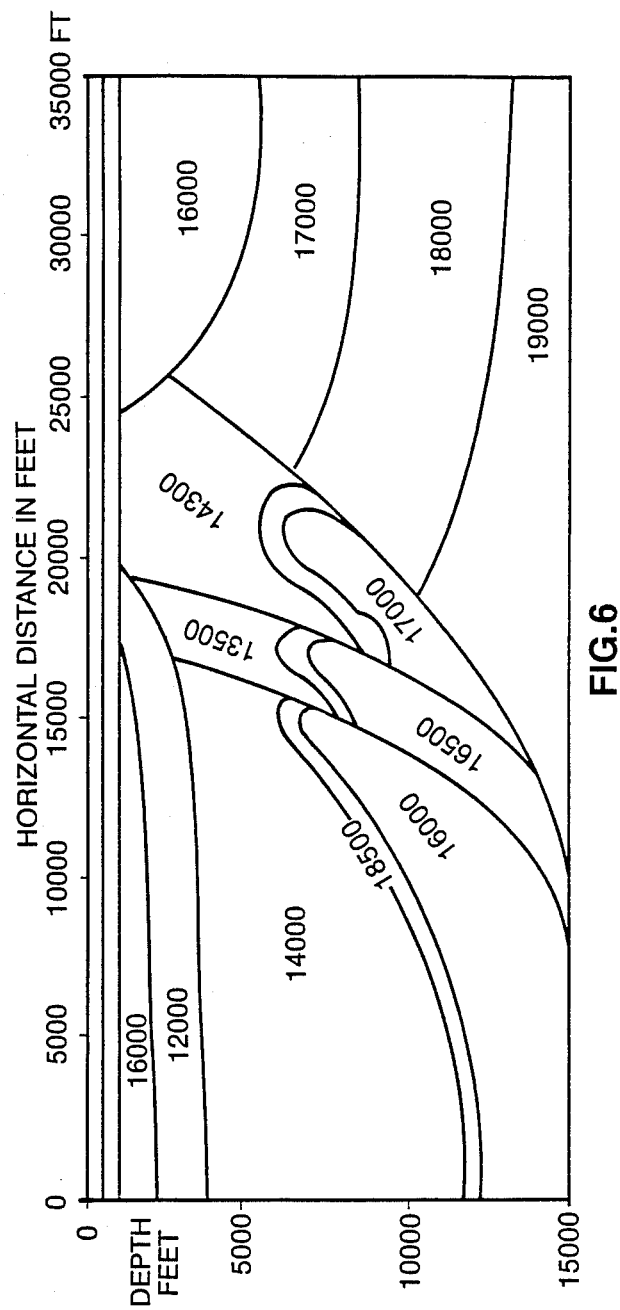
FIG. 6 depicts a model of the earth's subsurface formations.
Figure 7:
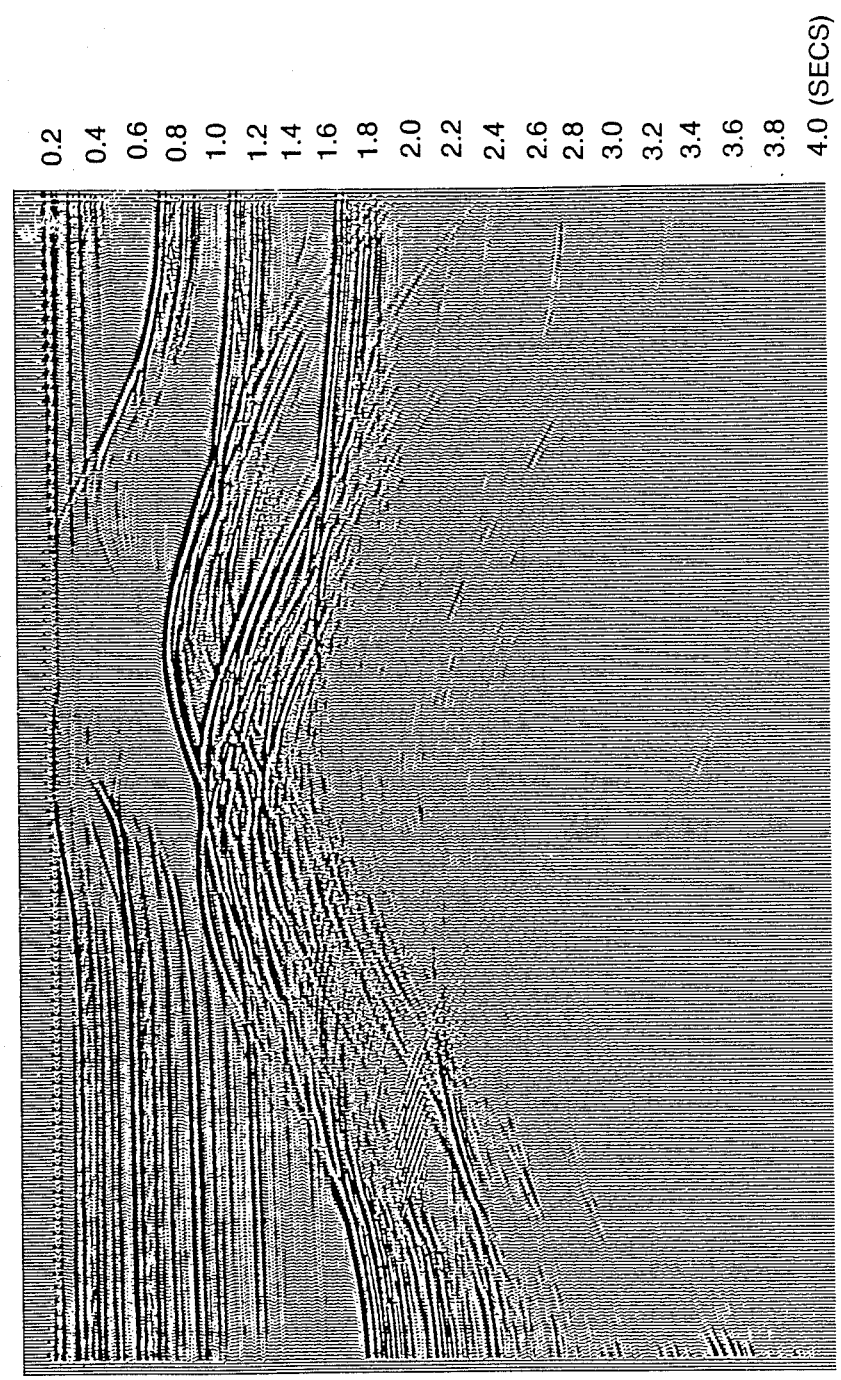
FIG. 7 is a synthetically derived CMP seismic section corrected for normal moveout for the model in FIG. 6.

Conventionally, to correct for this error in CMP processing, the seismic data can be migrated in an attempt to obtain true spatial positions. By way of example, FIG. 6 depicts a structural model of the earth's subsurface formations and the numbers superimposed on each bed represent its compressional wave interval velocity. FIG. 7 is a synthetic seismogram generated from the model using CMP processing and normal movement correction wherein the synthesized seismic data (i.e., $U_{11}$ using a convention to be detailed later) are developed for a source having a vertical line of action and a receiver having a vertical line of action. The structural relationship between FIG. 6 and FIG. 7 is obscure at best. By migrating the synthetic seismic data of FIG. 7 with the known model interval velocities, a synthetic depth image seismogram can be produced as in FIG. 8. Clearly, FIG. 8 produces a depth image somewhat more related to that of the model's geological structure in FIG. 6; however, the true depth image is still obscured for the complex part of the model. When dealing with real seismic data, as opposed to synthetic seismic data, not all of the variables are known. In fact, with CMP processing of real seismic data, accurate interval velocities are not known a priori and difficut to determine, especially for complex subsurface geological structures. Consequently, optimized depth images are difficult to obtain. This problem can be further exacerbated by the inadequacy of CMP processing to separate coupled compressional and shear wavefields recorded in the seismic signals $U_{ij}$.

Figure 8:
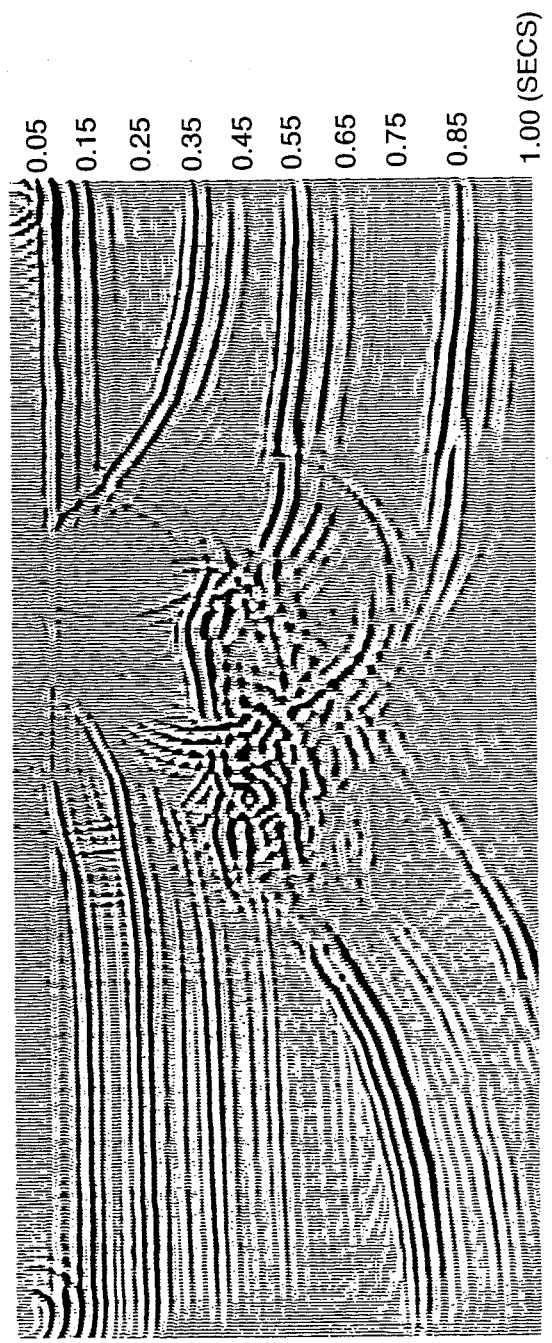
FIG. 8 depicts the synthetic seismic data of FIG. 7 after depth migrating a CMP stack of the data.
Figure 9:
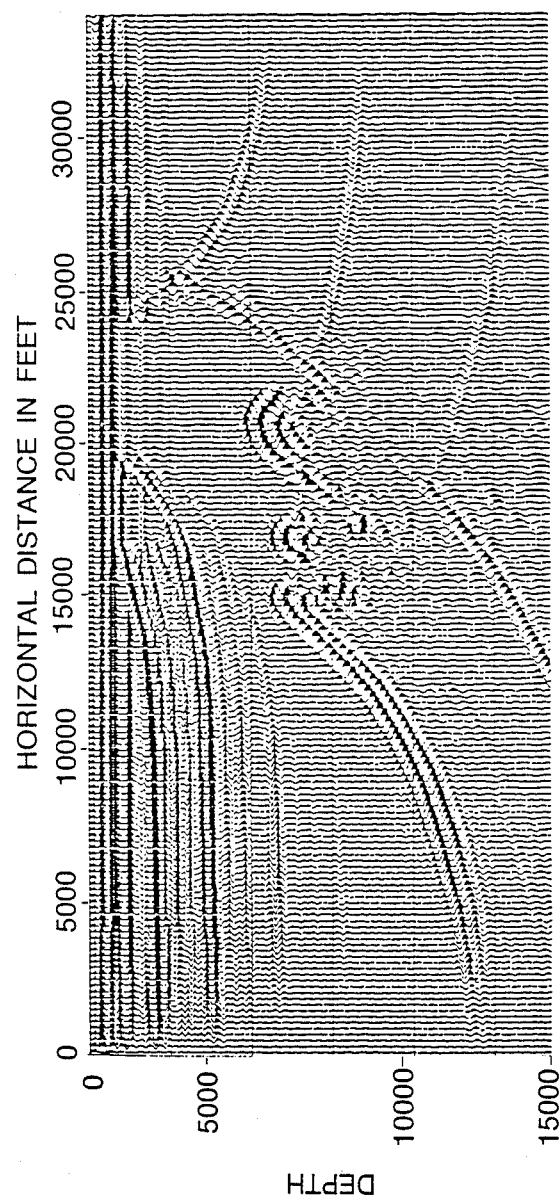
FIG. 9 depicts the synthetic seismic data for the model of FIG. 6 after processing according to the present invention.

As a prelude to a more complete discussion of the present method for depth imaging, attention is now drawn to FIG. 9 wherein the synthetic seismic data employed in FIGS. 7 and 8 have been processed in accordance with the present invention. The enhancement in the structural depth image is clearly apparent.

In order to overcome the limitations of conventional CMP processing and migration, we have developed a method for migrating multicomponent seismic data to obtain optimized depth images of the subsurface geological structure as well as obtain better estimates of compressional wave and shear wave interval velocities. In the preferred embodiment, a dyadic set of multicomponent seismic data are acquired (i.e., a seismic signals $U_{ij}$ where i represents the line of action of the source=1, 2, 3 and j represents the line of action of the receiver=1, 2, 3). For purposes of simplifying the following discussion, identification of source and receiver lines of action will use the following subscript convention; vertical=1, horizontal radial=2, and horizontal transverse=3. However, those skilled in the art will appreciate that other orientations of the lines of action with respect to the line of survey can also be employed.

A dyadic is a tensor of second order obtained from the product of two vectors. In the preferred embodiment, the dyadic set of multicomponent seismic data has nine components; however, it will be appreciated by those skilled in the art that less than a nine component dyadic set of multicomponent seismic data can still be effectively employed. However, as one reduces the dyadic set of multicomponent seismic data from nine components towards conventional single component seismic data (e.g., $U_{11}$ or $U_{22}$ or $U_{33}$) error is introduced.

Figure 10:
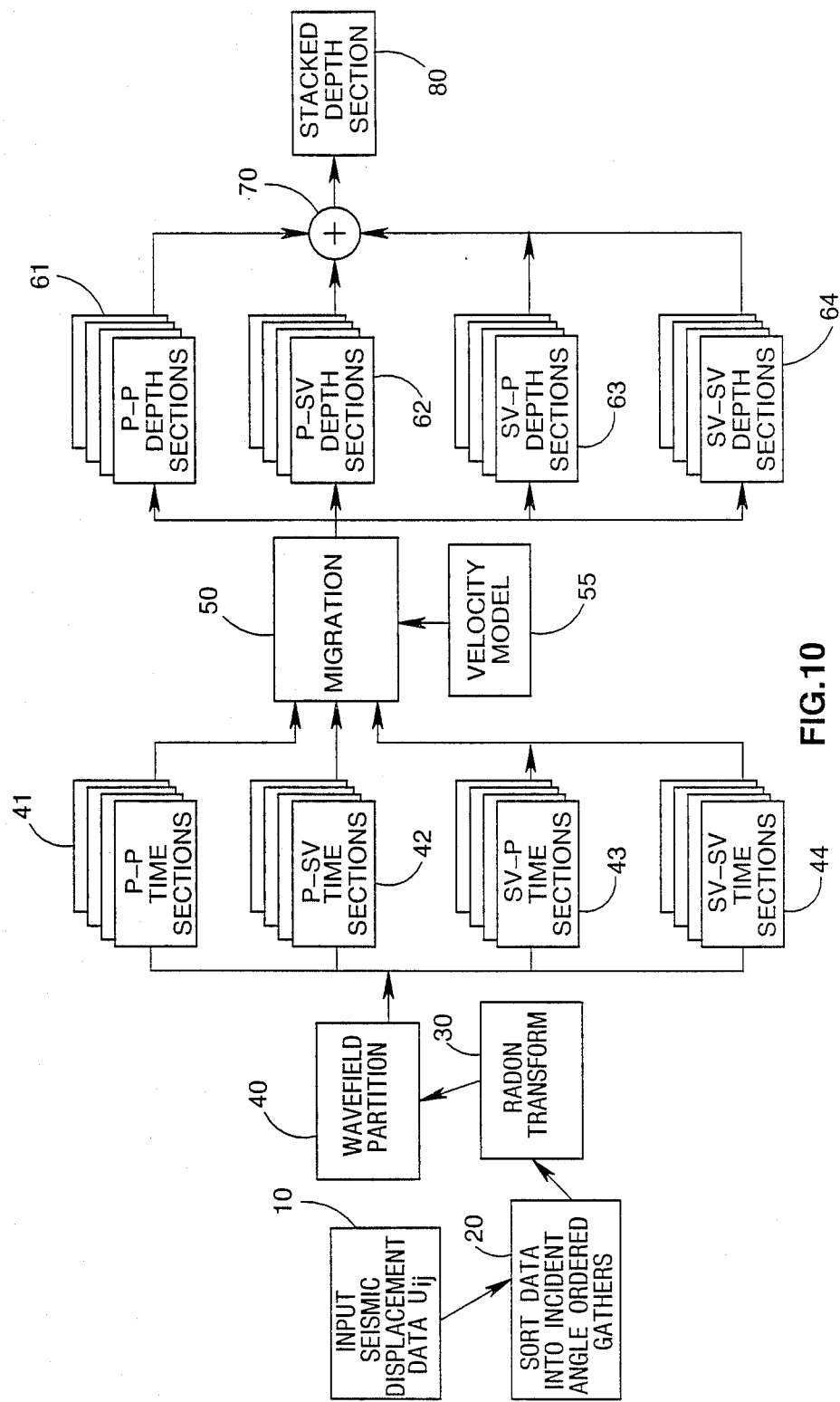
FIG. 10 is a process flow diagram of the present invention.

Now looking to FIG. 10, a generalized process flow diagram of the present invention is depicted. In particular, step 10 comprises collecting a dyadic set of multicomponent seismic data $U_{ij}$. Those skilled in the art will appreciate that the dyadic set of multicomponent seismic data (where $i=1$ and $j=1,2$ or $i=1,2$ and $j=1,2$ or $i=1,2$ and $j=1,2,3$, etc.) can be successfully used. At step 20, the dyadic set of multicomponent seismic data can be sorted into incident angle ordered gathers (e.g., common receiver gathers or reciprocally into common source gathers).

Figure 11:
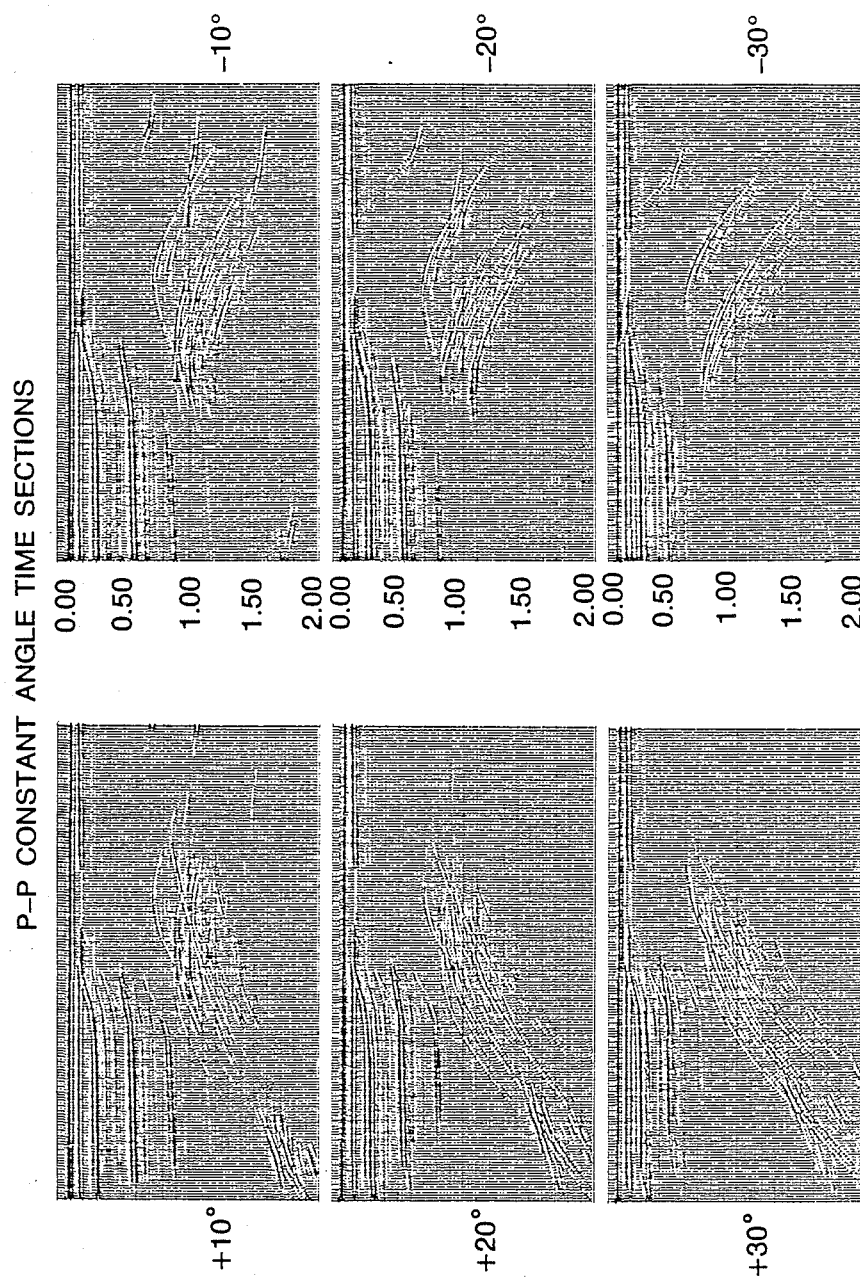
FIG. 11 depicts a plurality of synthetic $U_{11}$ constant angle plane wave time sections for the model of FIG. 7.

At step 30, the incident angle ordered gathers of the multicomponent seismic data $U_{ij}$ are radon transformed into a plurality of constant angle plane wave approximations. As shown in FIG. 11, the plurality of constant angle plane wave approximations of the seismic data $U_{11}$ can be represented as a plurality of constant angle plane wave seismic sections (e.g., 30°, 20°, 10°, −10°, −20°, −30°). Each constant angle plane wave seismic section provides a time image of the earth's geological structure which would result if the geological structure were "illuminated" by a set of sources producing a plane wave propagating downwardly through the earth at an incident angle $\alpha$ with the horizon. This "illumination" process is also referred by those in the art as plane wave beam forming. The constant angle plane wave seismic sections of FIG. 11 were synthetically obtained for the model of the subterranean formation shown in FIG. 6 using only the $U_{11}$ component of a dyadic set of multicomponent seismic data. By the convention adopted herein, $U_{11}$ represents the seismic signals recorded by a receiver having a vertical line of action in response to seismic energy imparted by a source having a vertical line of action. A plurality of similar constant angle plane wave seismic sections can also be produced for the other components of the dyadic set of multicomponent seismic data $U_{ij}$.

Figure 12:
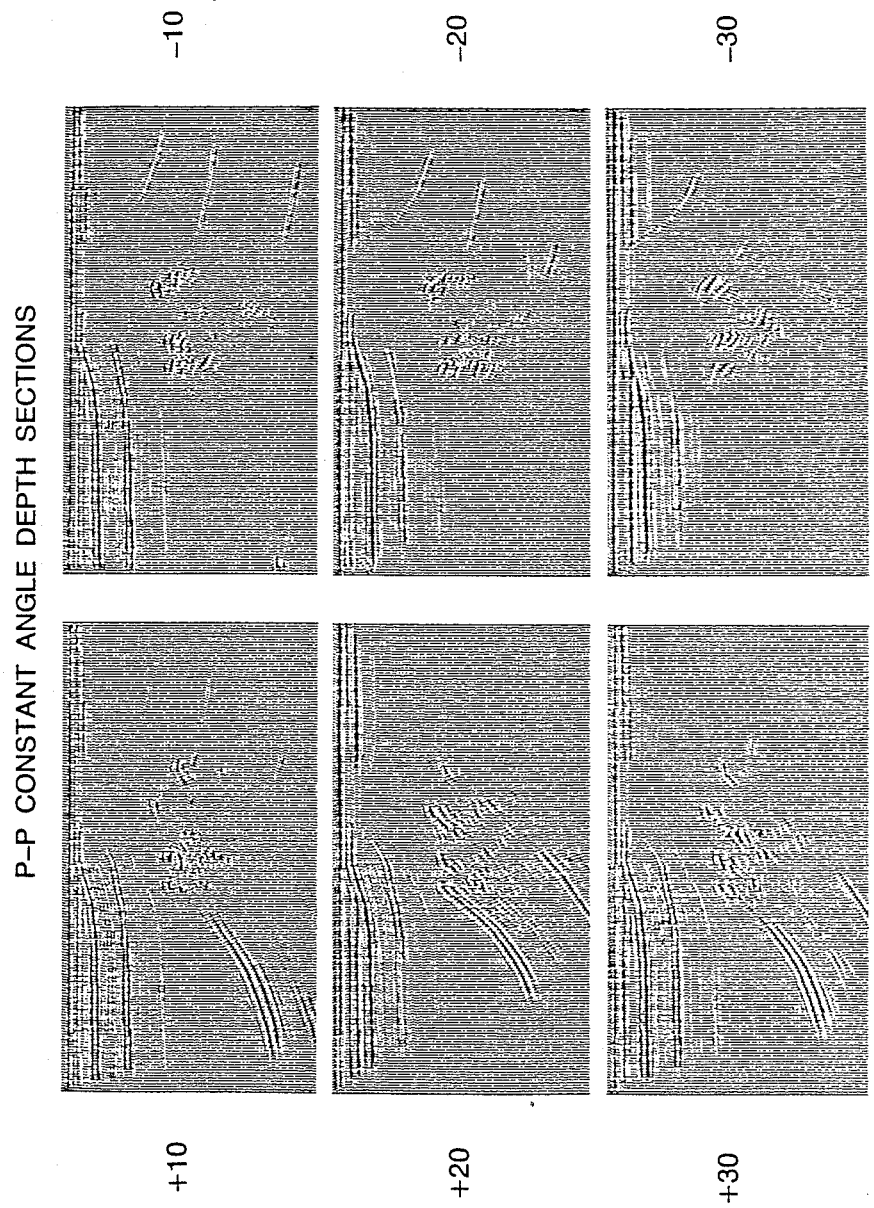
FIG. 12 depicts a plurality of synthetic P—P constant angle plane depth sections for the migrated seismic data of FIG. 11.

By waveifeld partitioning the radon transformed dyadic set of multicomponent seismic data $U_{ij}$ in step 40, a plurality of constant angle wavefield time sections 41-44 can be generated which represent combinations of incident wavefields-reflected wavefields potentials (e.g., P-P, P-SV, SV-P, and SV-SV). The wavefield potential time sections 41-44 each include a plurality of constant angle wavefield time sections. The significance of such wavefield partitioning is to separate and decouple compressional and shear wavefields in the recorded tensor displacement data $U_{ij}$. Wavefield partitioning can be done in either the time domain or frequency domain of the displacement tensor data $U_{ij}$. If done in the frequency domain, the wavefield partitioned displacement tensors $U_{ij}$ must be transformed back to the time domain after partitioning. The plurality of constant angle wavefield time sections 41-44 can then be migrated at step 50 using a velocity model from 55 to obtain interval velocities and to obtain a plurality of constant angle wavefield depth sections 61-64, as further shown in FIG. 12. The velocity model at 55 assumes both shear and compressional wavefield interval velocities.

Figure 13:
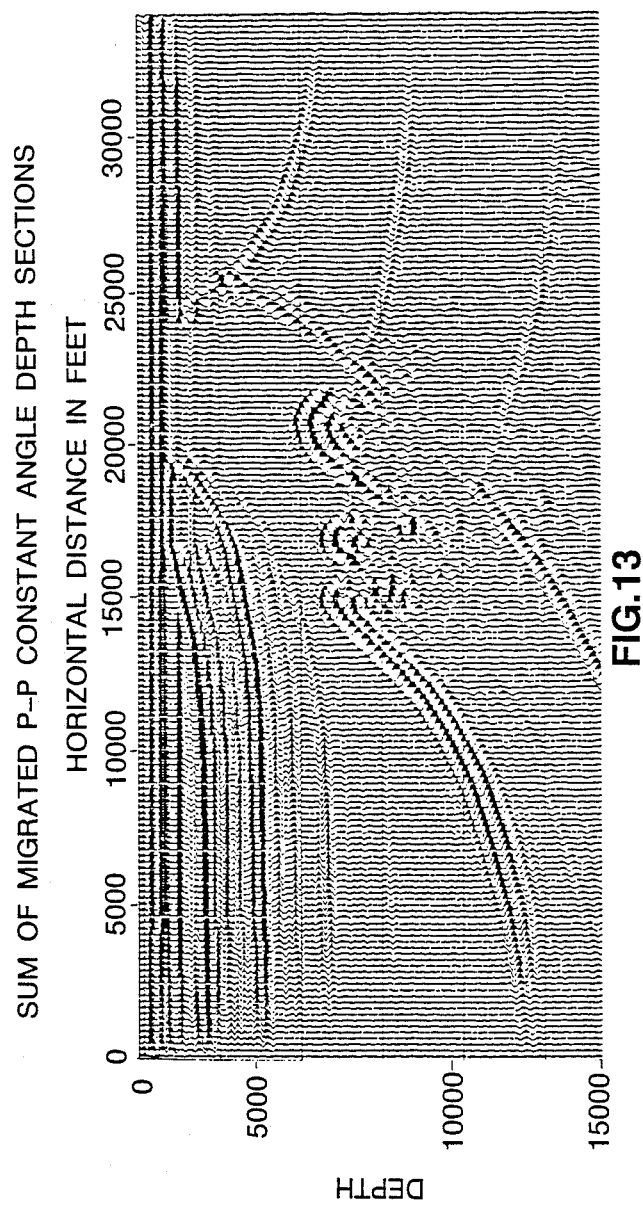
FIG. 13 depicts a sum of the migrated synthetic seismic data on FIG. 12.

At Step 70 the plurality of constant angle wavefield depth sections for each incident reflected combination of wavefields are summed to produce stacked depth sections 80, as further shown in FIG. 13. FIG. 13 depicts the sum of the constant angle depth sections for the P-P wavefields of FIG. 12. A comparison of FIG. 13 with the model of FIG. 6 and the conventionally CMP processed and migrated seismic data of FIGS. 7 and 8 shows a distinct improvement. The seismic data of FIG. 13 was processed over a different set of parameters than the same seismic data depicted in FIG. 7; however, good correlation exists between the two sections and the model of FIG. 6.

Figure 14:
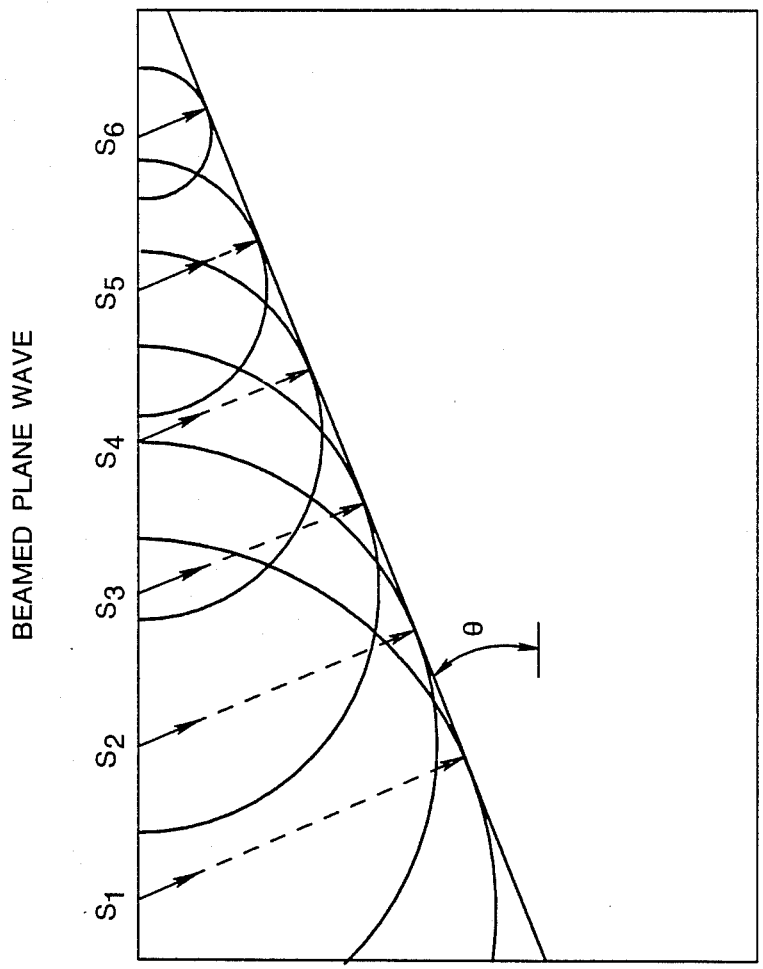
FIG. 14 depicts a beamed plane wave developed by sources $S_i$ propagating downwardly at an angle $\theta$ with the horizon.

The steps of the present invention will now be discused in greater detail. Referring first to the radon transformation of Step 30 in FIG. 10, radon transformation is also referred to in the art as slant stacking or $\tau$-p transformation. Radon transformation is a method for transforming conventional seismograms (i.e., a collection of time series values representative of recorded amplitude of a geophone) to simulate a plane wave propagating into the earth at an angle $\theta$ to the horizon as shown in FIG. 14. The radon transformation is discussed in more detail by Winney in U.S. Pat. No. 4,628,492 as well as C. H. Chapman in "Generalized Radon Transforms and Slant Stacks," *Geophysics J.R. astr. Soc.* (1981) 66, 445-453 and others.

By way of example, FIGS. 15a, b, c depict three different constant angle plane wave time sections developed by beaming forming plane waves on a subsurface model at three different angles ($\alpha_1$ $\alpha_2$ and $\alpha_3$). By forming down going plane waves having different angles $\alpha$ with the horizon, different aspects of reflecting horizon in the earth's subsurface are "illuminated." By way of note, the time sections in FIGS. 15a and c have not been corrected to give the usual normal moveout correction appearance and as such the horizons having a sloping appearance.

At this point, the significance of the wavefield partitioning will be discussed further. Unlike prior art techniques for migrating seismic displacement data, we migrate wavefields derived from the displacement tensors $U_{ij}$. By wavefield partitioning at step 40, the wavefields recorded in the displacement data $U_{ij}$ are decoupled from each other such that better estimates of the compressional and shear wave interval velocities can be more easily obtained and the resulting migrated sections will produce better depth images of the subsurface geological structure.

Figure 16A:
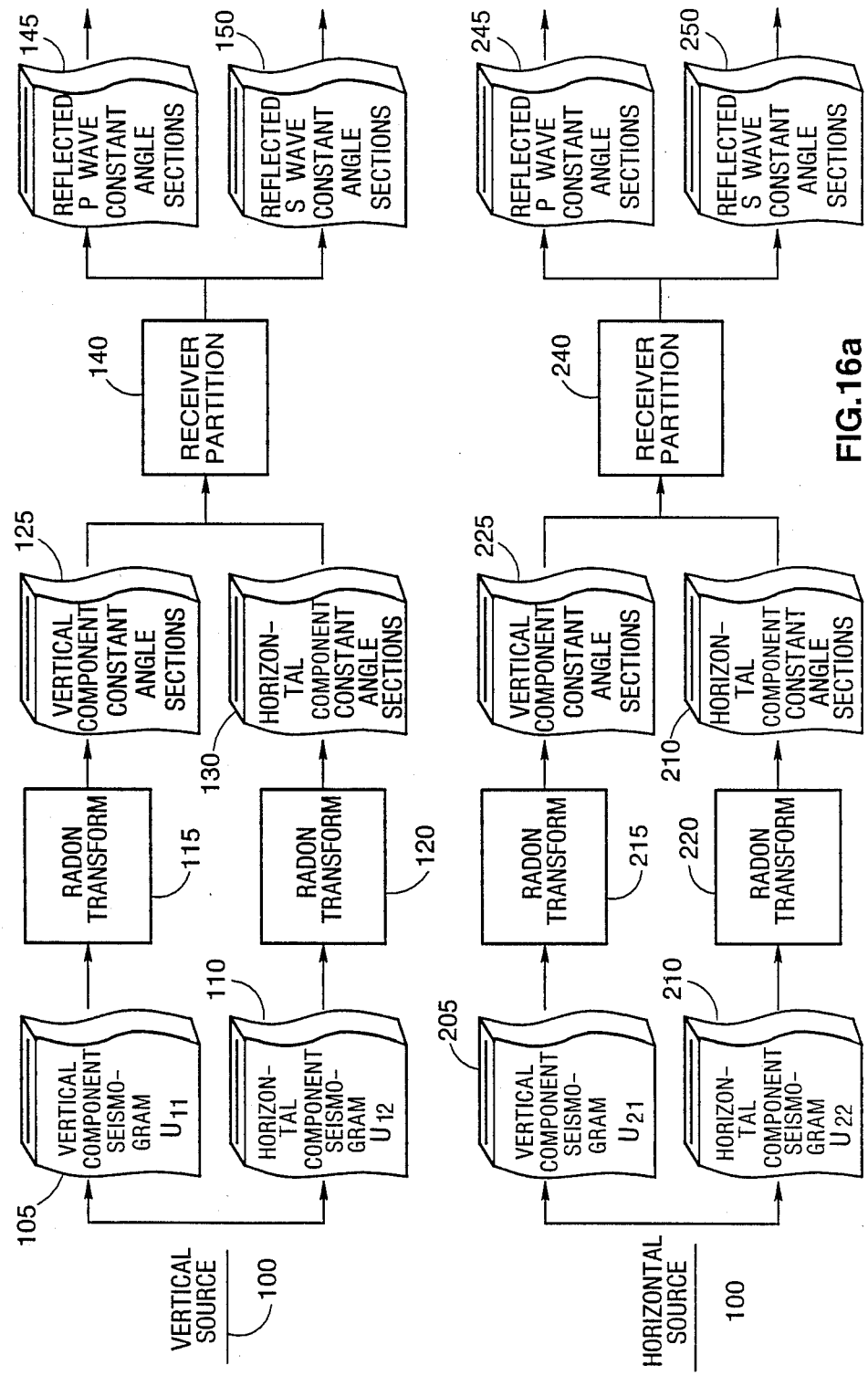
FIGS. 16a, b are flow diagrams depicting the steps of receiver and source partitioning.

With reference to FIGS. 16a, and b, wavefield partitioning will now be discussed in further detail. Wavefield partitioning comprises two steps: (1) receiver partitioning and (2) source partitioning. Receiver partitioning of the seismic displacement data $U_{ij}$ comprises separating and decoupling the wavefields recorded in the seismic data. For simplicity, the following discussion will be limited to the use of a vertical source and an in-line (radial) horizontal source in which compressional (P) and shear (S) wavefields are developed as well as receivers having vertical and horizontal lines of action (i.e., the seismic data recorded comprises $U_{11}$, $U_{12}$, $U_{21}$, and $U_{22}$). Recalling from FIGS. 1 and 2 that the recorded seismic data represents the tensor displacement of the earth to both upgoing and downgoing shear ($s^{up}$ and $s^{down}$) wavefields as well as compressional ($p^{up}$ and $p^{down}$) wavefields. At step 100, for a source having a vertical line of action and imparting seismic energy into the earth, vertical component seismograms $U_{11}$ are recorded at 105 by a receiver having a vertical line of action, and horizontal component seismograms $U_{12}$ are recorded at 110 by a receiver having a horizontal line of action. Similarly, at step 200, for a source having a horizontal line of action and imparting seismic energy into the earth, vertical component seismograms $U_{21}$ are recorded at 205 by a receiver having a vertical line of action, and horizontal component seismograms $U_{22}$ are recorded at 210 by a receiver having a horizontal line of action. The seismograms $U_{11}$, $U_{12}$, $U_{21}$, and $U_{22}$ are radon transformed at steps 115, 120, 215, and 220, respectively, to form a plurality of constant angle plane wave time sections 125, 130, 225, and 230, respectively.

The $U_{11}$ constant angle plane wave time sections 125 and the $U_{12}$ constant angle plane wave time sections 130 are receiver partitioned at 140 to obtain a plurality of constant angle reflected (p) wavefields 145 and constant angle reflected (s) wavefields 150. In a similar fashion, $U_{21}$ constant angle plane wave sections 225 and $U_{22}$ constant angle plane wave sections 230 are receiver partitioned at 240 to obtain a plurality of constant angle reflected (p) wavefields 245 and constant angle reflected (s) wavefields.

To receiver partition the displacement data $U_{ij}$, one can employ the Knott-Zoeppritz equation, as discussed by Keiiti Aki and Paul G. Richards in the text "Quantitative Seismology, Theory and Method", Freeman and Company, New York, 1980, Chapters 5.1 and 5.2. These equations will be represented by the matrix A below. Additionally, one must employ the Helmholtz decomposition:

$$U_{ij} = \Delta p^{tot} + \Delta \times s^{tot} \quad (1)$$

where:
$p^{tot} = p^{up} + p^{down}$
$s^{tot} = s^{up} + s^{down}$
$\Delta p^{tot}$ is the gradient of $p^{tot}$
$\Delta \times s^{tot}$ is the curl of $s^{tot}$ Accordingly, the receiver partitioning is then accomplished according to the matrix solution:

$$\begin{pmatrix} p^{up} \\ p^{down} \\ s^{up} \\ s^{down} \end{pmatrix} = A^{-1} \begin{pmatrix} U_{1j} \\ U_{2j} \\ \tau_{1j} \\ \tau_{2j} \end{pmatrix} \quad (2)$$

where:
$U_{1j}$ are the recorded components of the vertical source;
$U_{2j}$ are the recorded components of the horizontal source;
$\tau_{1j}$ are the recorded tractions of the vertical source;
$\tau_{2j}$ are the recorded tractions of the horizontal source; and
$\tau_{1j}$ and $\tau_{2j}$ at a free surface can be set = 0.

The reflected wavefields ($p^{up}$, $p^{down}$, $s^{up}$, and $s^{down}$) can generally be represented by the function $\phi_R(X_1, X_2, X_3, \omega,$ and V) where $X_1$, $X_2$, and $X_3$ are spatial constants, $\omega$ represents frequency, and V represents slowness.

The source partitioning at step 300 determines the compressional (P) and shear (S) wavefields generated by the vertical and horizontal sources according to:

$$\tau^{tot} = \Delta P + \Delta \times S$$

where:
$\Delta P$ is the gradient of P
$\Delta \times S$ is the curl of S or $$\begin{bmatrix} P \\ S \end{bmatrix} = \begin{bmatrix} iK_X & -iK_Z^S \\ iK_Z^P & iK_X \end{bmatrix}^{-1} \begin{bmatrix} \tau_1 \\ \tau_2 \end{bmatrix}$$

where
$K_X$ = horizontal wave number $$K_Z^P = \sqrt{\frac{\omega^2}{V_p^2} - K_x^2}$$

$$K_Z^S = \sqrt{\frac{\omega^2}{V_s^2} - K_x^2}$$

$\omega$ = frequency
$V_p$ = velocity of compressional wavefield
$V_s$ = velocity of shear wavefield
$\tau_1$ and $\tau_2$ are the traction of vertical and horizontal sources;
$i = \sqrt{-1}$ $$P = P_o \exp(iK_X \hat{X} + iK_Z^P \hat{Z} - i\omega t)$$

$$S = S_o \exp(iK_X \hat{X} + iK_Z^S \hat{Z} - i\omega t)$$

The determined incident wavefields (P and S) can generally be represented by the function $\phi_I(X_1, X_2, X_3, \omega,$ and V) where $X_1$, $X_2$, and $X_3$ are spatial coordinates, $\omega$ is frequency, and V is velocity.

The seismic imaging process for data of this form is similar to acoustic holography. If the frequency distribution of the source wavefield, $\phi_I(X_1, X_2, X_3, \omega, V)$, is known for all spatial locations, frequency $\omega$, and slowness V, and the reflected wavefield, $\phi_R(X_1, X_2, X_3, \omega, V)$, is similarly known, then we can define a reflectivity function according to the following normalized cross correlation:

$$R(\phi_I, \phi_R, X_1, X_2, X_3, V) \quad (3)$$

$$= \frac{\int \phi_I^*(X_1, X_2, X_3, \omega, V) \phi_R(X_1, X_2, X_3, \omega, V) d\omega}{\int \phi_I^*(X_1, X_2, X_3, \omega, V) \phi_I(X_1, X_2, X_3, \omega, V) d\omega}$$

Figure 16B:
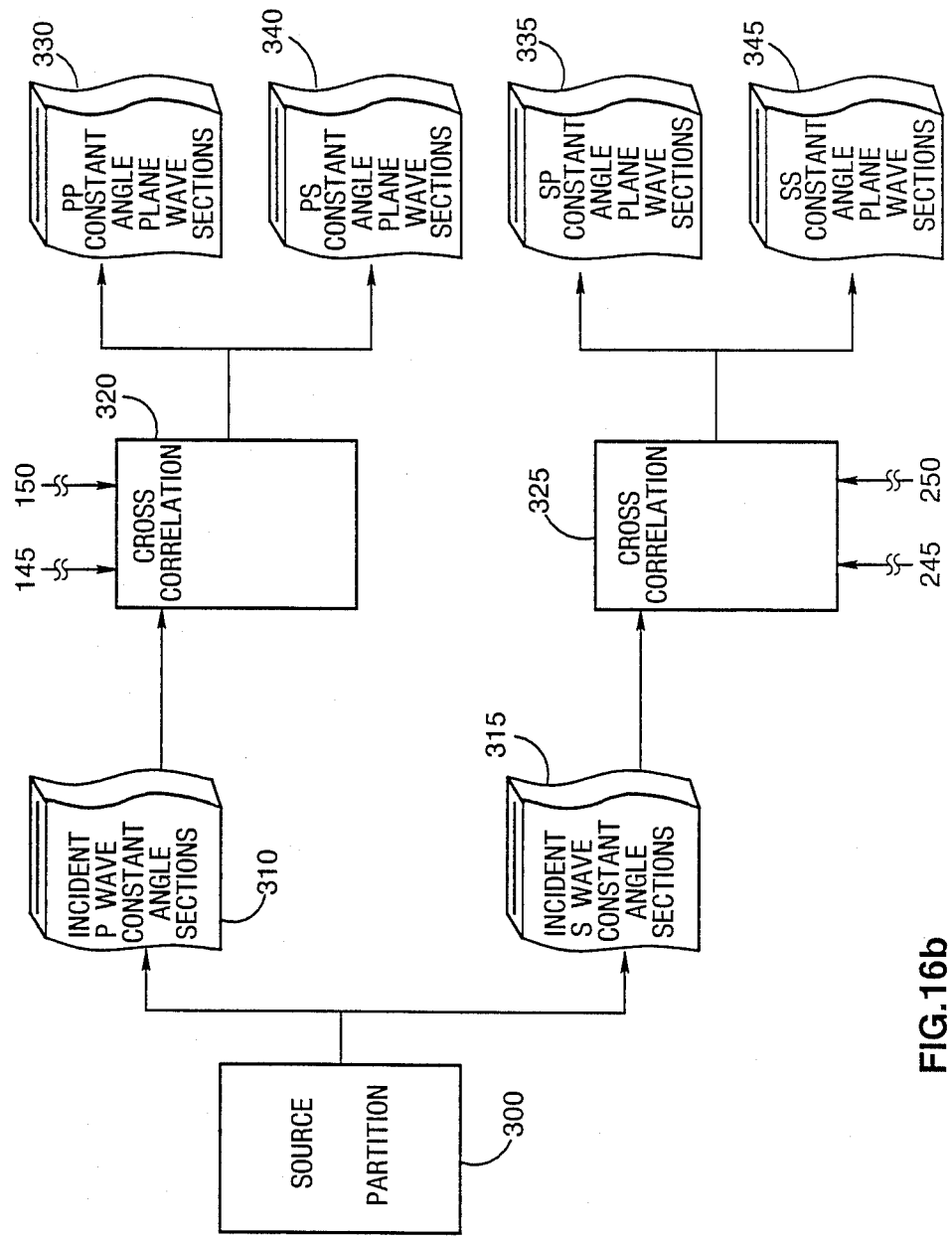

Thus, at step 330 of FIG. 16b, the incident compressional wavefields from 310 are cross-correlated with the corresponding constant angle reflected compressional wavefields from 145 and reflected shear wavefields from 150 to form constant angle plane wave time sections defining reflectivity coefficients for incident compressional-reflected compressional wavefield (PP) constant angle time sections at 330 and reflectivity coefficients for incident compressional-reflected shear wavefield (PS) constant angle time sections at 340. Similarly, at step 325, the incident shear wavefields from 315 are cross-correlated with the corresponding constant angle reflected compressional wavefields from 245 and reflected shear wavefields from 250 to form constant angle plane wave time sections defining reflectivity coefficients for incident shear-reflected compressional wavefield (SP) constant angle time sections at 335 and reflectivity coefficients for incident shear-reflected shear wavefield (SS) constant angle time sections at 345.

For primary reflections, the reflectivity coefficient R is a reasonable measure of the scaled phase similarity between the incident and reflected wavefields. If the angle between the incident and reflected fields is computed, then the reflectivity coefficient R can be modified to estimate angle dependent reflectivity. Angle dependent reflectivity has been demonstrated to be a hydrocarbon indicator. The advantages in the process are that the angle dependent amplitudes can be measured on depth sections instead of time sections. Thus, the amplitude anomalies can be measured at their true position in depth with any amplitude and polarity distortions caused by wave propagation removed. Each of the reflection coefficients (e.g., PP, PS, SP, and SS) can be estimated by Eq. (3) for properly computed incident and reflected fields (e.g., the PS reflection coefficient can be estimated from Eq. (3) provided the incident field, $\phi_I$, is a P-wave and the reflected field $\phi_R$, is an S-wave).

Figure 17:
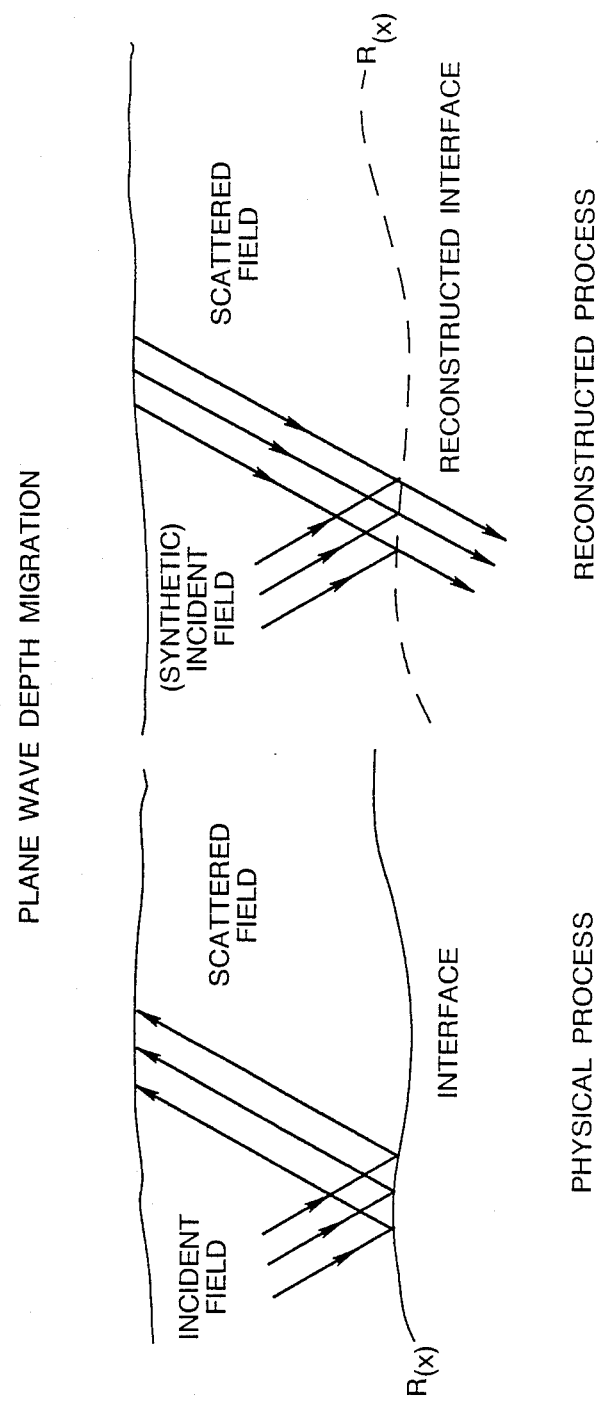
FIG. 17 depicts a physical seismic data acquisition process and a synthesized downward continuation to determine depth images of the earth's subsurface.

Eq. (3) represents an imaging process when the incident and reflected fields are known at all spatial locations. Since only the surface recording of the total wavefield is known, the incident and reflected wavefields in the earth's interior must be determined, as previously discussed. The determined incident and reflected fields at the earth's surface can be synthetically extrapolated downward as approximate solutions to the scalar or elastic wave equations. By way of example, FIG. 17 depicts the actual field process showing incident and reflected wavefields on a reflecting interface. FIG. 17 also depicts the synthetic process whereby one can replicate the field process. This synthetic extrapolation process is generally referred to as downward continuation or migration. While there are a number of methods for extrapolating wavefields into the earth's subsurface, the recursions in Eq. (4) and Eq. (5) below have proved to be very effective for properly extrapolating the primary phases and amplitudes of the incident and reflected fields:

$$\phi_I(X_1, X_2, X_3, \omega, V) = \quad (4)$$

$$\left(\frac{1}{2\pi}\right)^2 \int\int \left[ e^{i(K_1X_1 + K_2X_2)} - \right.$$

$$\left(\frac{\omega^2}{V_{I(X_1,X_2,X_3)^2}} - (K_1^2 + K_2^2)\right)^{\frac{1}{2}} \Delta X_3 \right) \cdot \int\int \phi_I(X_1, X_2, X_3 -$$

$$\left. \Delta X_3, \omega, V_I) \, e^{iK_1X_1' + iK_2X_2'} \, dX_1' dX_2' \right] dK_1 dK_2$$

$$\phi_R(X_1, X_2, X_3, \omega, V) = \quad (5)$$

$$\left(\frac{1}{2\pi}\right)^2 \int\int \left[ e^{i(K_1X_1 + K_2X_2)} + \right.$$

$$\left(\frac{\omega^2}{V_{I(X_1,X_2,X_3)^2}} - (K_1^2 + K_2^2)\right)^{\frac{1}{2}} \Delta X_3 \right) \cdot \int\int \phi_R(X_1, X_2, X_3 -$$

$$\left. \Delta X_3, \omega, V_R) \, e^{iK_1X_1' + iK_2X_2'} \, dX_1' dX_2' \right] dK_1 dK_2$$

where $V_I$ and $V_R$ are the incident and reflected field velocities. If the propagation medium is anisotropic, the exponential's exponent can be modified in (4) and (5) to represent the anisotropy.

Thus, the combination of Eq. (3), the imaging principle, and Eqs. (4)-(5), wavefield continuation, constitutes what is generally referred to as a depth migration, as undertaken at step 50 of FIG. 10. The incident wavefield is generated numerically at $X_3=0$, and the reflected field is computed from receiver partitioning at $X_3=0$. These fields are mathematically continued down into the earth's subsurface via Eqs. (4–5) and a reflectivity is computed from Eq. (3).

It is important to note that the continuation processes, Eqs. (4–5), are dependent on unknown interval velocities $V_I$ and $V_R$. While this may appear to be a limitation of the migration process, it is in fact part of its power. The earth's interval velocities generally must be estimated from seismic data in order to do a time-to-depth conversion in the CMP process, as done in the model of interval velocities at step 55 in FIG. 10. However, the velocities typically estimated in CMP processing are root mean square (RMS) or stacking velocities. The conversion from RMS or stacking velocities to interval velocities is only valid for horizontally stratified earth structures and small source-receiver offsets. The interval velocities can be directly estimated by iterative applications of the depth migration process described in Eqs. (3–5) for a variety of slowness parameters. In other words, migration is performed on a suite of constant slowness seismograms and the resultant depth sections are compared for consistency. If the spatial distribution of the depth sections is not similar, then the interval velocities are systematically changed and new suites of depth sections are generated and compared. In the comparison stage, it is possible to determine whether the interval velocities, assumed in the model at step 55, are generally too high or too low. Thus, it is possible to iteratively update the velocities to achieve reasonable consistency among all depth sections.

The iterative migration procedure can be used to simultaneously unravel velocity and structure. This procedure can also be extended to estimating velocity anisotropy by altering the phase shift exponent in Eqs. (3–5). The comparison process can be automated by updating the velocities via a least squares criterion.

Eqs. (3–4) are integral formulas of this process as applied to the migration process itself. There are two further uses of the wavefield continuation process which are essential. The first of these is source and receiver continuation. After partitioning the source and receiver seismograms into wavefield seismograms, it may be necessary to downward continue the surface wavefields to some subsurface datum in order to undo the effects of a complex velocity overburden. In such an overburden, the simple incident wavefields produced by a Radon transform at the surface will not remain simple when propagating through a variable velocity field. As a consequence, the image produced by Eq. (3) will systematically degrade as a function of depth. However, once the shallow velocity model has been determined, the whole seismic experiment can be downward continued to a new datum at the base of this velocity model. This is done by first downward continuing the common source seismograms with a recursive integral equations as in Eq. (5), then sorting this data into common receiver seismograms and repeating the continuation process. Once this has been completed, the Radon transform process and iterative migration process are repeated. This interweaving of Radon transforms, depth migration and downward continuation can be done as often as needed to facilitate the migration and velocity estimation process.

The final use of the downward continuation process is directed towards multiple removal. When seismic waves encounter geologic interfaces, they produce reflected waves which return directly to the earth's surface. They also produce waves which are multiply reflected, either off the surface or between geologic formations. These multiples destroy the one-to-one correspondence between geologic layers and seismic reflections. The wave partitioning and downward continuation processes can be combined to estimate and thus remove (to some degree) the effects of such multiple reflections. For example, the first order surface multiples can be removed by first computing the downgoing and upgoing wavefields into the subsurface over small depth strips via equations of the form of Eqs. (4-5) or, alternatively, from the surface to the first reflecting layer. Then at the layer to which these wavefields have been continued, conservation and continuity equations are invoked to estimate a new upgoing and downgoing field at the new level. Upon doing this, the multiple energy can be estimated and subtracted from the total field to give a new estimate of the primary reflections. With the multiples attenuated, the depth migration gives a better seismic depth image of the subsurface.

It will be appreciated that while a preferred embodiment of the invention has been described and illustrated numerous modifications, an alternation may be made without departing from the spirit and scope of the invention, as set forth in the following claims.

We claim:

1. A method of geophysical exploration to obtain depth images of the earth's subsurface geological structures, comprising the steps of:
   (a) obtaining separate measures of compressional and shear wavefields incident on reflecting interfaces in the earth's subsurface;
   (b) obtaining measures of compressional and shear wavefields scattered from the reflecting interfaces;
   (c) producing time-dependent reflectivity functions representative of the reflecting interfaces from the compressional and shear wavefields incident thereon and the compressional and shear wavefields scattered therefrom; and
   (d) migrating the time-dependent reflectivity functions to obtain depth images of the reflecting interfaces in the earth's subsurface.

2. The method of claim 1 wherein the step of obtaining separate measures of the compressional and shear wavefields incident on the reflecting interface comprises obtaining separate measures of the compressional and shear wavefields for seismic energy imparted into the earth's subsurface by seismic sources and the step of obtaining measures of the compressional and shear wavefields scattered from the reflecting interfaces comprises partitioning a set of multicomponent seismic data recording the earth's response to seismic energy imparted into the earth's subsurface by the seismic sources to form reflected compressional and shear wavefields.

3. The method of claim 1 wherein the step of producing time-dependent reflectivity functions representative of reflecting interfaces includes separately cross-correlating the compressional and shear wavefields incident on reflecting interfaces with the compressional and shear wavefields scattered from the reflecting interfaces.

4. The method of claim 1 wherein the step of migrating the time-dependent reflectivity functions representative of the reflecting interfaces includes iteratively assuming velocities of propagation for the incident and scattered compressional and shear wavefields.

5. A method of imaging multicomponent seismic data to obtain depth images of the earth's subsurface geological structures, comprising the steps of:
   (a) beam forming the multicomponent seismic data into sets of plane wave seismograms;
   (b) partitioning the plane wave seismograms into sets of compressional and shear wavefield seismograms;
   (c) forming time-dependent reflectivity functions from the sets of compressional and shear wavefield seismograms; and
   (d) migrating the time-dependent reflectivity functions to obtain depth images of the earth's subsurface geological structures.

6. The method of claim 5 wherein the step of beam forming the multicomponent seismic data includes forming sets of plane wave seismograms for a plurality of beamed angles.

7. The method of claim 6 wherein the step of partitioning the sets of plane wave seismograms includes forming sets of compressional and shear wavefield seismograms for the plurality of beamed angles.

8. The method of claim 7 wherein the step of forming time-dependent reflectivity functions includes forming a plurality of reflectivity functions for the plurality of beamed angles.

9. The method of claim 8 wherein the step of migrating the time-dependent reflectivity functions includes migrating the time-dependent reflectivity functions for each of the plurality of beamed angles and stacking the migrated time-dependent reflectivity functions for the plurality of beamed angles to form depth images of the earth's subsurface geological structures.

10. A method for imaging the earth's subsurface geological structures, comprising the steps of:
    (a) collecting a set of multicomponent seismic data with seismic sources having at least one linearly independent line of action and receivers having at least two linearly independent lines of action;
    (b) sorting the set of multicomponent seismic data into incident angle ordered gathers;
    (c) partitioning the incident angle ordered gathers of the set of multicomponent seismic data into compressional and shear wavefields; and
    (d) migrating the compressional and shear wavefields to obtain a depth image of the earth's subsurface geological structures.

11. The method of claim 10 wherein the step of sorting the set of multicomponent data includes the step of beam forming the set of multicomponent seismic data for a plurality of beamed angles.

12. The method of claim 10 further including the steps of:
    (a) transforming the set of multicomponent seismic data into the frequency domain;

(b) partitioning the frequency domain set of multicomponent seismic data into a plurality of wavefield potentials; and (c) transforming the plurality of compressional and shear wavefields to the time domain.

13. The method of claim 11 wherein the step of partitioning includes forming a plurality of compressional and shear wavefields incident upon reflecting interfaces in the earth's subsurface and resulting compressional and shear wavefields scattered from the reflecting interfaces.

14. The method of claim 13 further including the step of cross-correlating the incident and scattered compressional and shear wavefields to form time-dependent reflectivity functions representative of reflecting interfaces in the earth's subsurface.

15. The method of claim 14 wherein the step of migrating the compressional and shear wavefields includes migrating the time-dependent reflectivity functions to obtain depth images of the earth's subsurface geological structures.

16. The method of claim 15 further including the step of stacking the plurality of migrated compressional and shear wavefields to form depth images of the earth's subsurface geological structures.

17. A method for imaging the earth's subsurface geological structures, comprising the steps of:
(a) collecting a set of multicomponent seismic data;
(b) partitioning the set of multicomponent seismic data so as to separate and decouple compressional and shear wavefield potentials in the set of multicomponent seismic data;
(c) iteratively migrating the separated and decoupled compressional and shear wavefields for a plurality of assumed compressional and shear interval velocities; and
(d) selecting from the plurality of assumed compressional and shear wave and shear interval velocities, the compressional interval velocities which produce coherent migrated wavefields.

18. The method of claim 17 wherein the step of partitioning includes obtaining a measure of the compressional and shear wavefields incident upon reflecting interfaces and resulting compressional and shear wavefields scattered therefrom.

19. The method of claim 18 further including the step of cross-correlating the compressional and shear wavefields incident and scattered from reflecting interfaces to obtain a reflectivity functions representative of the reflecting interfaces.

20. The method of claim 19 wherein the step of iteratively migrating the compressional and shear wavefields includes iteratively migrating the shear and compressional wavefields of the incident and scattered compressional and shear wavefields according to a model of the compressional and shear wave velocities of propagation in the earth's subsurface.

21. A method of geophysical exploration to obtain depth images of the earth's subsurface geological structures from multicomponent seismic data $U_{ij}$, wherein seismic energy is imparted into the earth with seismic sources having at least one linearly independent line of action i and the earth's response thereto is recorded by receivers having at least two linearly independent lines of action j, comprising steps of:
(a) obtaining separate measures of compressional and shear wavefields generated by the seismic energy imparted into the earth which are incident on reflecting interfaces in the earth's subsurface;
(b) obtaining separate measures of compressional and shear wavefields scattered from reflecting interfaces in the earth's subsurface from the multicomponent seismic data $U_{ij}$; and
(c) migrating the incident and scattered compressional and shear wavefields to obtain depth images of the earth's subsurface geological structures.

22. The method of claim 21 further including a step of:
separately cross-correlating the incident compressional and shear wavefields with the scattered compressional and shear wavefields to produce a plurality of time-dependent reflectivity functions representative of reflecting interfaces in the earth's subsurface.

23. The method of claim 22 further including the step of:
migrating the plurality of time-dependent reflectivity functions to obtain depth images of the reflecting interfaces and the earth's subsurface.

24. A method of imaging multicomponent seismic data $U_{ij}$, wherein seismic energy is imparted into the earth with seismic sources having at least one linearly independent line of action i and the earth's response thereto is recorded by receivers having at least two linearly independent lines of action j, comprising the steps of:
(a) radon transforming the multicomponent seismic data $U_{ij}$;
(b) partitioning the radon transform multicomponent seismic data $U_{ij}$ to separate and decouple measures of compressional and shear wavefields scattered from reflecting interfaces in the earth's subsurface;
(c) partitioning the seismic energy imparted into the earth to separate the decouple measures of compressional and shear wavefields incident on the reflecting interfaces in the earth's subsurface; and
(d) migrating the compressional and shear wavefields incident on reflecting interfaces and the compressional and shear wavefields scattered from the reflecting interfaces to obtain depth images of the earth's subsurface geological structures.

25. A method for imaging the earth's subsurface geological structures, comprising the steps of:
(a) obtaining a set of multicomponent seismic data $U_{ij}$, wherein seismic energy is imparted into the earth with seismic sources having at least one linearly independent line of action i and recording the earth's response thereto with receivers having at least two linearly independent lines of action j;
(b) partitioning the multicomponent seismic data $U_{ij}$ so as to separate and decouple compressional and shear wavefields measured by the set of multicomponent seismic data $U_{ij}$ and
(c) migrating the separated and decoupled compressional and shear wavefields so as to obtain depth images of the earth's subsurface geological structures.

26. A method for imaging the earth's subsurface geological structures with multicomponent seismic data $U_{ij}$, wherein the multicomponent seismic data $U_{ij}$ is obtained by imparting seismic energy into the earth with seismic sources having at least one linearly independent line of action i and recording the earth's response thereto with receivers having at least two linearly independent lines of action j, comprising the steps of:

(a) radon transforming the multicomponent seismic data $U_{ij}$ to obtain sets of plane wave seismograms, wherein each set of plane wave seismograms includes plane wave seismograms for a plurality of incident angles;

(b) partitioning each set of plane wave seismograms to separate and decouple compressional and shear wavefields scattered from reflecting interfaces in the earth's subsurface;

(c) partitioning the seismic energy imparted into the earth to separate and decouple measures of compressional and shear wavefields incident on reflecting interfaces in the earth's subsurface (d) cross correlating the incident and reflecting compressional and shear wavefields to obtain a plurality of time-dependent reflectivity functions; and (e) iteratively migrating the plurality of time-dependent reflectivity functions for a plurality of compressional and shear wavefield interval velocities to determine the compressional and shear wavefield interval velocities which produce spatially consistent depth images.

27. The method of claim 5 further including the step of:

(a) iteratively migrating the time-dependent reflectivity functions for a plurality of compressional and shear wavefield interval velocities to determine the compressional and shear wavefield interval velocities which produce spatially consistent depth images of the earth's subsurface geological structures.

28. The method of claim 10 further including the step of:

(a) iteratively migrating the time-dependent reflectivity functions for a plurality of compressional and shear wavefield interval velocities to determine the compressional and shear wavefield interval velocities which produce spatially consistent depth images of the earth's subsurface geological structures.

29. The method of claim 21 further including the step of:

(a) iteratively migrating the incident scattered compressional and shear wavefields for a plurality of compressional and shear wavefield interval velocities to determine the compressional and shear wavefield interval velocities which produce spatially consistent depth images of the earth's subsurface geological structures.

30. The method of claim 24 further including the step of:

(a) iteratively migrating the incident scattered compressional and shear wavefields for a plurality of compressional and shear wavefield interval velocities to determine the compressional and shear wavefield interval velocities which produce spatially consistent depth images of the earth's subsurface geological structures.

31. The method of claim 25 further including the step of:

(a) iteratively migrating the incident scattered compressional and shear wavefields for a plurality of compressional and shear wavefield interval velocities to determine the compressional and shear wavefield interval velocities which produce spatially consistent depth images of the earth's subsurface geological structures.

* * * * *

UNITED STATES PATENT OFFICE
CERTIFICATE OF CORRECTION

PATENT NO. : 4,766,574
DATED : August 23, 1988
INVENTOR(S) : Norman D. Whitmore, Jr., Kurt J. Marfurt It is certified that error appears in the above-identified patent and that said Letters Patent are hereby corrected as shown below:

Column 3, line 58, "(Sup," should read --($S^{up}$,--.

Column 3, line 59, after "wavefields" delete "potentials".

Column 4, line 65, after "tion" ";" should read --:--.

Column 5, line 52, after "wavefields" delete "potentials".

Signed and Sealed this

Seventh Day of February, 1989

*Attest:*

DONALD J. QUIGG

*Attesting Officer*  *Commissioner of Patents and Trademarks*